(12) United States Patent
Windecker

(10) Patent No.: US 7,330,461 B2
(45) Date of Patent: Feb. 12, 2008

(54) METHOD TO CONTROL DATA CONVERSION IN THE TRANSFER OF A CONNECTION BETWEEN A PACKET-SWITCHED AND A LINE-SWITCHED COMMUNICATIONS NETWORK

(75) Inventor: Rainer Windecker, München (DE)

(73) Assignee: Siemens Aktiengesellschaft, Munich (DE)

( * ) Notice: Subject to any disclaimer, the term of this patent is extended or adjusted under 35 U.S.C. 154(b) by 1150 days.

(21) Appl. No.: 09/962,849

(22) Filed: Sep. 26, 2001

(65) Prior Publication Data

US 2002/0037003 A1 Mar. 28, 2002

(30) Foreign Application Priority Data

Sep. 26, 2000 (DE) .................. 100 47 658

(51) Int. Cl.
*H04L 12/66* (2006.01)
*H04L 12/56* (2006.01)

(52) U.S. Cl. ...................... 370/352; 370/401
(58) Field of Classification Search ........ 370/352–356, 370/401, 466, 465
See application file for complete search history.

(56) References Cited

U.S. PATENT DOCUMENTS

| | | | | |
|---|---|---|---|---|
| 5,982,767 | A * | 11/1999 | McIntosh | 370/352 |
| 6,205,413 | B1 * | 3/2001 | Bisdikian et al. | 703/24 |
| 6,215,783 | B1 * | 4/2001 | Neyman | 370/353 |
| 6,285,680 | B1 * | 9/2001 | Steinka et al. | 370/431 |
| 6,292,553 | B1 * | 9/2001 | Fellingham et al. | 379/221.02 |
| 6,324,409 | B1 * | 11/2001 | Shaffer et al. | 455/552.1 |
| 6,363,065 | B1 * | 3/2002 | Thornton et al. | 370/352 |
| 6,542,504 | B1 * | 4/2003 | Mahler et al. | 370/392 |
| 6,628,610 | B1 * | 9/2003 | Waclawsky et al. | 370/229 |
| 6,674,745 | B1 * | 1/2004 | Schuster et al. | 370/352 |
| 6,690,651 | B1 * | 2/2004 | Lamarque et al. | 370/252 |
| 6,717,939 | B1 * | 4/2004 | McGrew | 370/352 |
| 6,735,175 | B1 * | 5/2004 | Havens | 370/236 |
| 6,754,180 | B1 * | 6/2004 | Christie | 370/236 |
| 6,757,276 | B1 * | 6/2004 | Harper et al. | 370/356 |
| 6,785,261 | B1 * | 8/2004 | Schuster et al. | 370/352 |
| 6,795,867 | B1 * | 9/2004 | Ma et al. | 709/240 |
| 6,798,745 | B1 * | 9/2004 | Feinberg | 370/235 |
| 6,829,234 | B1 * | 12/2004 | Kaplan et al. | 370/352 |
| 6,829,254 | B1 * | 12/2004 | Rajahalme et al. | 370/535 |
| 6,868,080 | B1 * | 3/2005 | Umansky et al. | 370/354 |

(Continued)

OTHER PUBLICATIONS

Martin Rowe, "Measure VoIP Networks for Jitter and Loss", Cahners Business Information, Newton, MA, Dec. 1999, downloaded Nov. 28, 2000.

(Continued)

*Primary Examiner*—Edan Orgad
*Assistant Examiner*—Blanche Wong
(74) *Attorney, Agent, or Firm*—Staas & Halsey LLP

(57) ABSTRACT

In the transfer of a connection between a packet-switched and a line-switched communications network, conversion of user data which are to be transmitted via the connection is controlled by a first gateway device disposed between the packet-switched and the line-switched communications network. The conversion is carried out depending on transfer information which is formed by a second gateway device located on the path of the connection and disposed between the line-switched and a further packet-switched communications network.

2 Claims, 1 Drawing Sheet

U.S. PATENT DOCUMENTS

| | | | |
|---|---|---|---|
| 6,928,068 B1* | 8/2005 | Crowe et al. | 370/352 |
| 2001/0036172 A1* | 11/2001 | Haskal | 370/352 |
| 2003/0002475 A1* | 1/2003 | Derks | 370/352 |
| 2003/0095539 A1* | 5/2003 | Feuer | 370/352 |

OTHER PUBLICATIONS

Hamdi et al., "Voice Service Interworking for PSTN and IP Networks," IEEE Communications Magazine, vol. 37, No. 5, May 1999, pp. 104-111.

Anquetil et al., "Media Gateway Control Protocol and Voice Over IP Gateways," Electrical Communication, Apr. 1, 1999, pp. 151-157.

Hoshi et al. "Voice Stream Multiplexing between IP Telephony Gateways," IEICE Transactions on Information and Systems, vol. E82-D, No. 4, Apr. 1999, pp. 838-845.

* cited by examiner

METHOD TO CONTROL DATA CONVERSION IN THE TRANSFER OF A CONNECTION BETWEEN A PACKET-SWITCHED AND A LINE-SWITCHED COMMUNICATIONS NETWORK

BACKGROUND OF THE INVENTION

1. Field of the Invention

The present invention is directed to transferring data between a packet-switched network and a line-switched network.

2. Description of the Related Art

In contemporary communications systems, connections to transfer continuous data streams, e.g., for voice or video communications, are also routed to an increasing extent via packet-switched communications networks, such as LANs (Local Area Network), MANs (Metropolitan Area Network) or WANs (Wide Area Network). Internet telephony, which is also frequently referred to as "Voice over Internet Protocol" (VoIP), for example, is based on this technology.

To transmit a continuous data stream via a packet-switched communications network, the data stream is divided up into individual data packets, which are in each case provided with a destination address and are transmitted via the packet-switched communications network. On emerging from the packet-switched communications network, a continuous data stream is recomposed from the data packets. Since the data packets are transmitted in the packet-switched communications network essentially independently from one another, the data packets do not normally arrive at equidistant time intervals at the exit. To equalize transit time fluctuations of this type, the data packets are temporarily stored, prior to the composition of the data stream, in a data-packet buffer memory operating according to the continuity principle, from which they are read out at constant time intervals. A continuous data stream can be reconstructed in this way from data packets arriving at irregular time intervals. A data-packet buffer memory of this type is also frequently referred to as a jitter buffer. However, a disadvantage of a jitter buffer of this type is that the data transmission is thereby additionally delayed.

Furthermore, in the transmission of user data within data packets, a higher transmission bandwidth is usually required than for the transmission of these user data via a line-switched network, since a data packet header with address and control data must be additionally transmitted with each data packet. For this reason, inter alia, a data stream which is to be transmitted is frequently compressed using data-compression methods in the transfer into a packet-switched communications network. In the transfer from a packet-switched communications network into a line-switched communications network, the data stream is frequently decompressed by the gateway, since, for example, ISDN terminals cannot usually carry out decompression. However, with many conventional compression methods, e.g., according to ITU-T Recommendation G.723, information loss occurs.

Insofar as the connection between the sender and recipient of a data stream is routed via an individual, continuous packet-switched communications network, a delay which occurs in the conversion of the data stream or a slight information loss is usually tolerable. However, particularly in the case of modern heterogeneous communications networks, a multiple transfer frequently occurs between one or more packet-switched communications networks and one or more line-switched communications networks between the sender and recipient of a data stream. However, as a result of the repeated conversion of the data which are to be transmitted at the transfer points between the communications networks, the delay times and information losses at the individual transfer points are added together. In the case of a transmission of voice data, even a twofold compression and decompression of the voice data according to the aforementioned G.723 Recommendation results in the voice output at the receiving end being barely comprehensible. In addition, a long transmission delay in a voice transmission is perceived by a user as very negative.

SUMMARY OF THE INVENTION

The object of the present invention is to indicate a method for controlling a conversion of user data which is to be transmitted via a connection when the connection is transferred between a packet-switched and a line-switched communications network, by which increasing impairments of the transmission quality can be prevented, particularly in the case of multiple transfers between packet-switched and line-switched communications networks.

The method according to the invention enables the control of a conversion of user data which are to be transmitted via a connection in the transfer between a packet-switched and a line-switched communications network. The conversion is controlled by a first gateway device which is disposed between the packet-switched and the line-switched communications network. The control is carried out here depending on transfer information which is formed by a second gateway device located on the path of the connection and disposed between the line-switched and a further packet-switched communications network. The transfer information indicates that a further transfer of the connection between the line-switched and the further packet-switched communications network takes place. Insofar as transfer information of this type has been formed, it can be assumed that the connection runs, at least partially, between two packet-switched communications networks. In the control of the conversion by the first gateway device, it can be correspondingly taken into account that the data packets which are to be converted into a data stream are again converted into data packets in the second gateway device at the latest.

In this way, for example, buffer storage provided to equalize transit time fluctuations in the user data packets can be prevented in the first gateway device if the transfer information indicates a further transfer of the connection into the further packet-switched communications network. The transmission delay is minimized by preventing the buffer storage. However, transmission quality is not thereby reduced, since it can generally be assumed that a further buffer storage of data packets will take place between the further packet-switched communications network and the connection destination.

Analogously, conversion of the user data, e.g., compression or decompression, can be prevented in the transfer between the line-switched and the packet-switched communications network, if it can otherwise be assumed that the conversion was canceled in the transfer into the further packet-switched communications network.

According to an advantageous embodiment of the invention, the transfer information formed by the second gateway device can be forwarded along the connection path to the first gateway device to influence the conversion of the user data therein. Alternatively, the transfer information can also be forwarded by the second gateway device to a connection controller, which instigates control of the user data conversion in the first gateway device depending on the derived transfer information.

According to a further advantageous embodiment of the invention, setup of a data-packet-transparent tunnel connection to the first gateway device can be initiated by the second gateway device if a transfer of a connection between the line-switched and the further packet-switched communications network is detected. As soon as the initiation of the tunnel connection is recognized by the first gateway device, this initiation can be evaluated as such as an indicator that the connection is further routed through a further packet-switched communications network. The conversion of the user data can thus be controlled depending on the recognition of the initiation. The control signals for setting up the tunnel connection can, to a certain extent, be interpreted as transfer information, on the basis of which the conversion is controlled.

According to a further advantageous embodiment of the invention, setup of a data-packet-transparent tunnel connection to the second gateway device can generally be initiated by the first gateway device. The tunnel connection can then be accepted by the second gateway device, if a transfer of the connection between the line-switched and the further packet-switched communications network is detected. As soon as the first gateway device recognizes that the tunnel connection has been accepted, this can be evaluated as an indicator that the connection is further routed through a further packet-switched communications network. The user data conversion can thus be controlled depending on the acceptance of the tunnel connection. The confirmation signals by which acceptance of the tunnel connection is indicated can, to a certain extent, be interpreted as transfer information, on the basis of which the conversion is controlled. A "PPP" (Point-to-Point Protocol) connection can preferably be set up as a data-packet-transparent tunnel connection.

Furthermore, conversion information relating to conversion characteristics of the conversion device can be formed by a conversion device disposed on the connection path between the second gateway device and a connection destination. The user data conversion can then be controlled by the first gateway device depending on the conversion information which is formed. If the conversion device is used e.g., to compress or decompress user data, the conversion information can indicate, for example, a compression factor and/or a decompression method. If the conversion device is used to convert data packets into a continuous data stream and has a jitter buffer for this purpose, the conversion information can indicate the size of the jitter buffer or the transmission delay caused by the jitter buffer.

Furthermore, the transfer information may advantageously comprise connection information identifying the connection, with reference to which the first gateway device or the connection controller identifies the connection for which user data conversion must be controlled.

BRIEF DESCRIPTION OF THE DRAWINGS

Exemplary embodiments of the invention are explained in detail below with reference to the drawing, in which, in each case as a schematic representation.

DETAILED DESCRIPTION OF THE PREFERRED EMBODIMENTS

Figure 1:
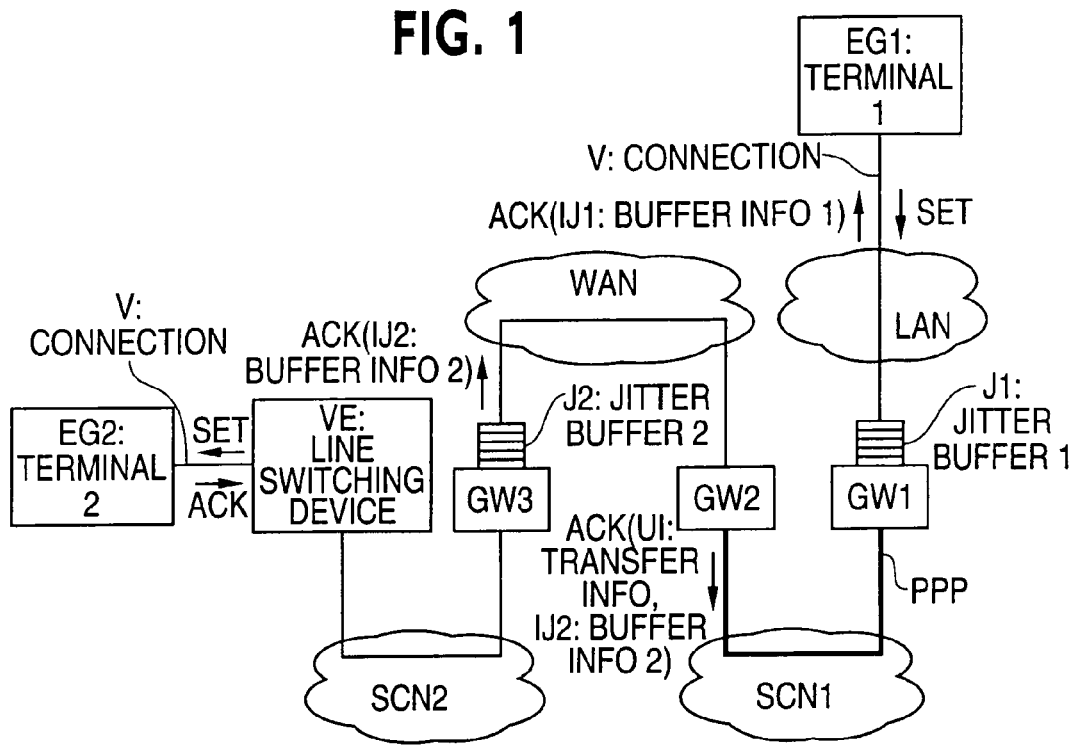
FIG. 1 is a block diagram of a communications system for setting up a connection routed via packet-switched and line-switched communications networks.
Figure 2:
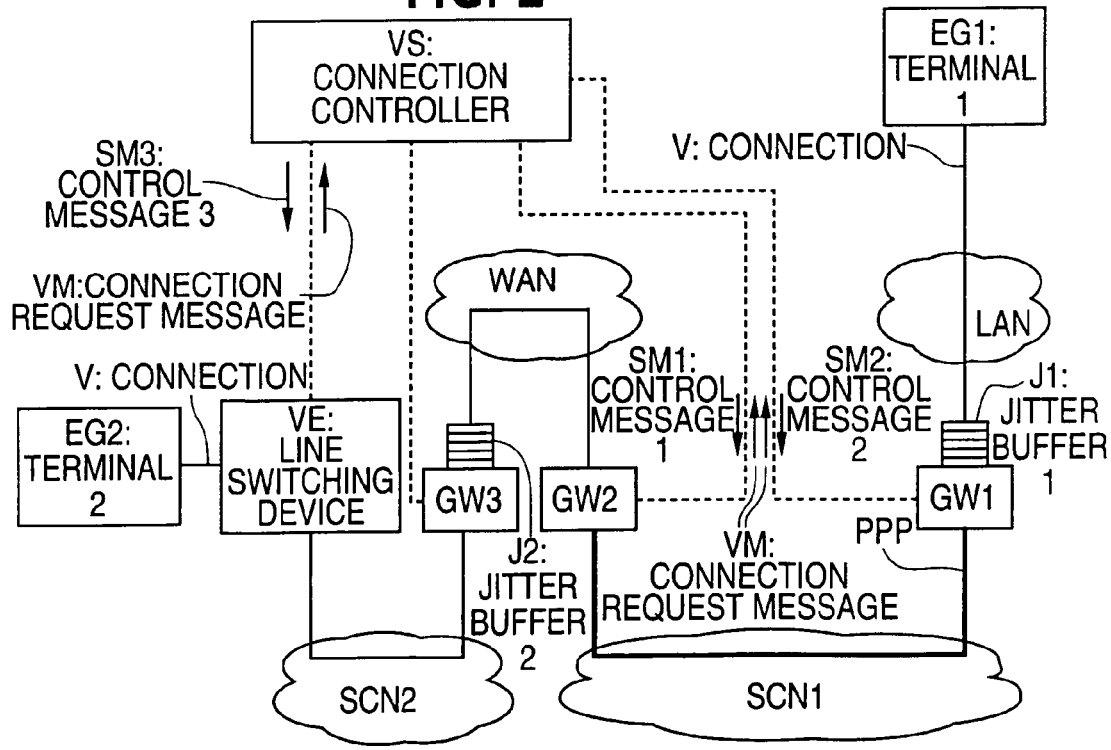
FIG. 2 is a block diagram of the communications system illustrated in FIG. 1 with an additional connection controller.

FIGS. 1 and 2 in each case show a schematic representation of a communications system in setting up a connection V routed via a plurality of packet-switched communications networks WAN and LAN and a plurality of line-switched communications networks SCN1 and SCN2. The connection path of the connection V which is to be set up is routed from a terminal EG1 via a local area network LAN to a gateway device GW1, from the latter via a line-switched communications network SCN1 to a gateway device GW2, from the latter via a wide area network WAN to a gateway device GW3, from the latter via a line-switched communications network SCN2 to a line-switching device VE and finally from the latter to a terminal EG2. The line-switched communications networks SCN1 and SCN2 may, for example, be implemented by "SCNs" (Switched Circuit Network) using TDM (Time Division Multiplex) transmission technology. The Internet, for example, may be used as the wide area network WAN.

In the connection V, which may be used, for example, for voice and/or video communications, a continuous data stream, e.g., a voice data and/or video data stream, is to be transferred from the terminal EG1 to the terminal EG2. For the sake of clarity, only one connection setup and data transport in the direction from the terminal EG1 to the terminal EG2 is considered below. The information set out below applies accordingly to a connection setup or data transport in the opposite direction.

The gateway devices GW1 and GW3 have, in each case, in the receive direction to the respective packet-switched communications network LAN or WAN, a jitter buffer J1 or J2 to equalize transit time fluctuations of received data packets. The gateway device GW2, in the receive direction to the wide area network WAN, similarly has a jitter buffer which, however, is required only for data transmissions in the direction from the wide area network WAN to the line-switched communications network SCN1. Since only a data transport in one direction is shown in the exemplary embodiments, the jitter buffer of the gateway device GW2 is not shown in the drawing. The jitter buffers J1 and J2 are in each case implemented as FIFO (First in First out) buffer memories operating according to the continuity principle. Data packets arriving at irregular time intervals are temporarily stored therein for a brief period so that they can in turn be read out at constant time intervals. The data packets which are read out can thus be converted into a continuous data stream for transmission in the line-switched communications network SCN1 or SCN2.

A first exemplary embodiment of the invention, in which no central connection controller is required, is explained below with reference to FIG. 1.

In FIG. 1, a connection setup message SET is transferred from the terminal EG1 via the local area network LAN, the gateway device GW1, the line-switched communications network SCN1, the gateway device GW2, the wide area network WAN, the gateway device GW3, the line-switched communications network SCN2 and the line-switching device VE to the connection destination EG2 to set up the connection V. A setup message SET, for example, using the QSIG protocol according to the ETSI standard or the DSS1 protocol according to the ITU-T Recommendation can be transferred as the connection setup message. The connection setup message SET is acknowledged by the destination terminal EG2 by an acknowledgement message ACK, which is transferred from the terminal EG2 along the connection path of the connection V to the terminal EG1.

Instigated by the initiation of the connection setup, those gateway devices located on the connection path in which the user data to be transferred via the connection V are transferred from a packet-switched into a line-switched communications network in each case form buffer information relating to characteristics of a jitter buffer provided for user data conversion. The buffer information may indicate, for example, the buffer size or the transmission delay caused by the jitter buffer concerned. In the first exemplary embodiment, a transfer of this type takes place only in the gateway devices GW1 and GW3. Here, the gateway device GW3 forms buffer information IJ2 indicating the size of the jitter buffer J2 and transmits this with the acknowledgement message ACK to the gateway device GW1. Analogously, the gateway device GW1 forms buffer information IJ1 indicating the size of the jitter buffer J1 and transmits this with the acknowledgement message ACK to the terminal EG1.

Furthermore, those gateway devices located on the connection path, in which devices the user data to be transferred via the connection V are transferred from a line-switched into a packet-switched communications network, in each case form transfer information UI in order thus to inform other gateway devices of this transfer. In the first exemplary embodiment, a transfer of this type takes place only in the gateway device GW2, so that the transfer information UI is formed by this gateway device GW2 only. The gateway device GW2 adds the transfer information UI to the acknowledgement message ACK and transmits this in this way via the line-switched communications network SCN1 to the gateway device GW1. The transfer information UI is transparently forwarded, if necessary, by line-switching devices (not shown) of the line-switched communications network SCN1.

To incorporate the transfer information UI and/or the buffer information IJ1, IJ2 into the acknowledgement message ACK, the signaling protocol on which the connection setup signaling is based can be modified accordingly. The connection setup message SET or the acknowledgement message ACK may furthermore contain an information element (not shown) to cause the gateway devices GW1, GW2 and GW3 along the connection path to form the transfer information UI and/or the buffer information IJ1, IJ2. The transfer information UI and/or the buffer information IJ1, IJ2 may also be transmitted with the connection setup message SET to control a conversion of user data when a two-way connection is set up, the data being transmitted from the terminal EG2 to the terminal EG1.

The transfer information UI and/or the buffer information IJ1, IJ2 may, for example, also be transferred by subscriber-to-subscriber signaling or inband signaling. The inband signaling may be carried out within a time slot or frequency range reserved for this purpose or may be overlaid over the user data which are to be transmitted.

By receiving the transfer information UI, the gateway device GW1 obtains the information that the connection path of the connection V is further routed between the gateway device GW1 and the connection destination EG2 through at least one packet-switched communications network, in this case the wide area network WAN. It can therefore be assumed that at least one further jitter buffer, in this case J2, is located on the connection path between the gateway device GW1 and the connection destination EG2. In the gateway device GW1, the size of the jitter buffer J2 is furthermore known with the buffer information IJ2. The gateway device GW1 can therefore determine, e.g., by comparing the size of its own jitter buffer J1 with the size of the jitter buffer J2, whether the jitter buffer J2 is also able to equalize the data packet transit time fluctuations which occur in the local area network LAN. If so, the jitter buffer J1 is disabled by the gateway device GW1 for the connection V; i.e., the data packets received from the local area network LAN via the connection V bypass the jitter buffer JI and, immediately after having been received, are forwarded via the line-switched communications network SCN1 to the gateway device GW2.

To transfer the data packets between the gateway devices GW1 and GW2, a data-packet-transparent tunnel connection PPP, e.g., according to the "Point-to-Point protocol", or an "IP-over-ATM" (Internet Protocol over ATM: IPoA) connection is set up between these gateways. A tunnel connection of this type can preferably be set up between two gateway devices connected via a line-switched communications network if one or both of these gateway devices receives the information that the connection via the respective other gateway device is likewise routed into a packet-switched communications network.

According to one variant of the invention, those gateway devices located on the connection path in which the user data to be transferred via the connection are transferred from a line-switched into a packet-switched communications network, in this case GW2 only, can initiate a setup of a tunnel connection against the transmission direction of the user data. In this case, the transfer information UI serving as an indicator of a transfer of user data comprises signaling messages for setting up the tunnel connection.

A second exemplary embodiment of the invention is explained below with reference to FIG. 2.

FIG. 2 shows the communications system from FIG. 1, supplemented with an additional central connection controller VS in schematic representation. Functional components which correspond to one another are designated in FIG. 1 and FIG. 2 with the same reference symbols.

The connection controller VS can be connected to the gateway devices GW1, GW2 and GW3 of the communications system via logical signaling channels. The logical signaling channels are shown in FIG. 2 by broken lines. The connection controller VS has structural information relating to the structure of the communications system. In the setting up of the connection V, which is routed from the terminal EG1 via the same connection path as in FIG. 1 to the terminal EG2, a connection request message VM is in each case transferred by the gateway devices GW1, GW2 and GW3 located on the connection path via a respective logical signaling channel to the connection controller VS. With the connection request messages VM, the buffer information IJ1 and IJ2 can preferably also be transmitted to the connection controller VS. Following the transfer of the connection request messages VM, the connection controller VS can determine, with the aid of the structural information, which jitter buffers on the connection path of the connection V are dispensable and between which gateway devices a tunnel connection PPP is to be set up. In the present, second exemplary embodiment, the connection controller VS recognizes that the jitter buffer J1 is not required for the user data which are to be transmitted via the connection V from the terminal EG1 to the terminal EG2, since a further jitter buffer J2 is located downstream in the connection direction. The connection controller VS furthermore recognizes that a data-packet-transparent tunnel connection PPP can be set up between the gateway devices GW1 and GW2. The connection controller VS consequently transfers a control message SM1 to the gateway device GW1, by which the jitter buffer J1 is disabled for the connection V. Furthermore, setup of the tunnel connection PPP between the gateway devices GW1 and GW2 is initiated by the connection controller VS by the control message SM1 and a control message SM2 transferred to the gateway device GW2. In addition, the connection controller VS transmits a control message SM3 to the gateway device GW3, indicating that the connection path in the direction of the destination terminal EG2 is not routed via a packet-switched communications network. Consequently, a user data conversion normally provided when a connection is transferred between a packet-switched communications network and a line-switched communications network is retained unchanged by the gateway device GW3.

In both exemplary embodiments, a compression, decompression or other conversion of user data to be transmitted via the connection V which takes place when a transfer occurs between a line-switched communications network and a packet-switched communications network can also be controlled in the same way as the buffer storage of the user data. Thus, for example, a changeover of user data coding in the gateway device GW1 can be prevented if it is recognized with reference to the transfer information UI or a connection request message VM that a new changeover to the original user data coding would take place in the gateway device GW2.

In this way, for example in the case of voice transmissions, a multiple changeover of voice coding, e.g., between the voice coding according to ITU-T Recommendation G.711 and the voice coding according to ITU-T Recommendation G.723, can be avoided. Since a changeover of the voice coding in most conventional voice-coding methods results in a loss of voice information, the quality of the voice transmission would deteriorate substantially in the event of a multiple successive changeover.

What is claimed is:

1. A method to control a conversion of user data which are to be transmitted via a connection between a first packet-switched communications network and a line-switched communications network provided by a first gateway device, comprising:

forming transfer information relating to a transfer of the user data between the line-switched communications network and a second packet-switched communications network by a second gateway device disposed between the line-switched communications network and the second packet-switched communications network;

forming conversion information relating to conversion characteristics of a conversion device disposed on a path of connection between the second gateway device and a connection destination; and controlling the conversion of the user data by the first gateway device based on the transfer information and the conversion information.

2. A control system controlling a first gateway device and a second gateway device for conversion of user data to be transmitted via a connection between a first packet-switched communications network and a line-switched communications network, comprising:

transfer information means for forming transfer information relating to a transfer of the user data between the line-switched communication network and a second packet-switched communications network by the second gateway device disposed between the line-switched communications network and the second packet-switched communications network; and means for forming conversion information relating to conversion characteristics of a conversion device disposed on a path of connection between the second gateway device and a connection destination; and control means for controlling the conversion of the user data by the first gateway device based on the transfer information and the conversion information.

* * * * *